(12) United States Patent  
Vaes (10) Patent No.: US 7,957,241 B2
(45) Date of Patent: Jun. 7, 2011

(54) DEVICE AND METHOD FOR DETECTING DEFECT SIGNALS ON AN OPTICAL DISC

(75) Inventor: Stefan Vaes, Houthalen (BE)

(73) Assignee: Sunext Technology Co., Ltd., Hsinchu (TW)

( * ) Notice: Subject to any disclaimer, the term of this patent is extended or adjusted under 35 U.S.C. 154(b) by 13 days.

(21) Appl. No.: 12/656,469

(22) Filed: Feb. 1, 2010

(65) Prior Publication Data

US 2011/0019518 A1    Jan. 27, 2011

(30) Foreign Application Priority Data

Jul. 27, 2009   (TW) ................................ 98125152 A (51) Int. Cl.
*G11B 7/00*  (2006.01)
(52) U.S. Cl. ..................................... 369/53.15
(58) Field of Classification Search ............... 369/53.14, 369/53.15, 47.14, 53.12, 53.17, 53.32, 53.42, 369/53.35

See application file for complete search history.

(56) References Cited

U.S. PATENT DOCUMENTS 6,807,137 B2 * 10/2004 Chuang ........................ 369/59.24
7,301,871 B2    11/2007 Lai et al.

* cited by examiner

*Primary Examiner* — Nabil Z Hindi
(74) *Attorney, Agent, or Firm* — Bacon & Thomas, PLLC (57) ABSTRACT

A device for detecting defect signals on an optical disc includes a finite state machine (FSM) to control a servo system of an optical disk drive. When the FSM is in a DETECT state and defect signals are greater than thresholds, a detection counter is set to a first predetermined value and the FSM enters an ARM state. In the ARM state, when the detection counter counts zero, the FSM enters a KICK state and the detection counter is set to a second predetermined value. In the KICK state, a flag signal XDFCT is asserted. When the detection counter in the KICK state counts to zero, the FSM enters a WAIT state and the detection counter is set to a third predetermined value. When the flag signal XDFCT is asserted, corresponding servo control signals for the servo system are clamped to a programmable constant voltage.

17 Claims, 6 Drawing Sheets

DEVICE AND METHOD FOR DETECTING DEFECT SIGNALS ON AN OPTICAL DISC

BACKGROUND OF THE INVENTION

1. Field of the Invention

The present invention relates to the technical field of signal detection and, more particularly, to a method and device for detecting defect signals on an optical disc.

2. Description of Related Art

Currently, with the rapid development of information industry and the widespread use of personal computers, people relatively increase on the requirement of data storage capability. Due to having large storage capacity, optical discs are thus widely used for storing data. The optical discs include CDROM/R/RW discs, DVDROM SL/DL discs, DVD-R/-R9/-RW/-RAM/Download discs, DVD+R/+R9/+RW discs, BDROM SL/DL discs, BD-R SL/DL discs, BD-RE SL/DL discs, BD LTH discs and so on. The optical discs can offer the internal data better protection to avoid various damages.

However, for data storage, the aforementioned feature does not mean that the optical discs are a perfect storage medium. Some defects, such as deep and shallow scratches, even a fingerprint, can be present on the optical discs. Such defects can cause the system read and write errors and the interference, and thus detecting the defects on the optical discs is important for protecting the system from being interfered or unstable.

One way in the prior art essentially uses a main or side beam signal or the combination to detect the defects on the optical discs.

Figure 1A:
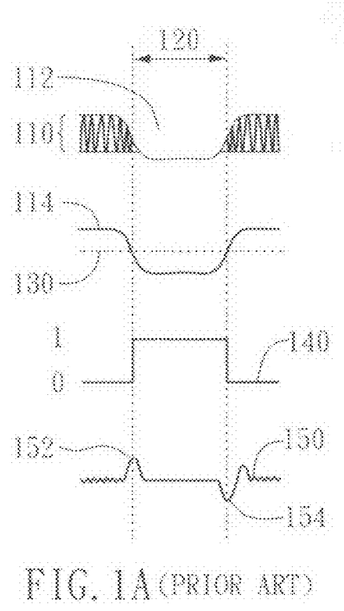
FIG. 1A is a schematic graph of signals of a deep defect detected by applying a prior RF level detection.

Another way in the prior art uses the difference of signal amplitude such as an RF level (RFLVL) to detect an existing defect. FIG. 1A is a schematic graph of signals of a deep defect detected by applying a well-known RF level detection. As shown in FIG. 1A, the RF signal 110 has a depressed portion 112 in the period 120, which indicates the data corresponding to the depressed portion 112 is damaged due to a defect, so the RF signal 110 in the period 120 cannot be read out. The depressed portion 112 indicates a defective region with a low reflectivity. This is commonly referred to as a black-dot defect, and the RF signal 110 in the depressed portion 112 almost disappears.

Further, the depth of the depressed portion 112 indicates the defect depth. The RF level signal 114 RFLVL produced by passing the RF signal 110 through a low pass filter is the envelope of the RF signal 110. The detection threshold 130 can be a fixed DC reference voltage. When the RFLVL signal 114 in the period 120 is lower than the detection threshold 130, a detect flag signal 140 is changed from a low level (logic 0) to a high level (logic 1) to thereby indicate that a defect is detected. In addition, a focusing error/tracking error (FE/TE) signal 150 has a positive surge 152 at the start of the period 120 to indicate a focusing error and a negative surge 154 at the end of the period 120 to indicate a tracking error. However, when the defect flag signal 14 is changed from the low to the high level, the servo system such as an FE/TE servomotor, and the data path control system such as a preamplifier, data slicer or phase lock loop (PLL) can know the situation that the defect signal is detected. Accordingly, some appropriate protection methods and devices can be used to reduce the voltage interference and instability.

Figure 1B:
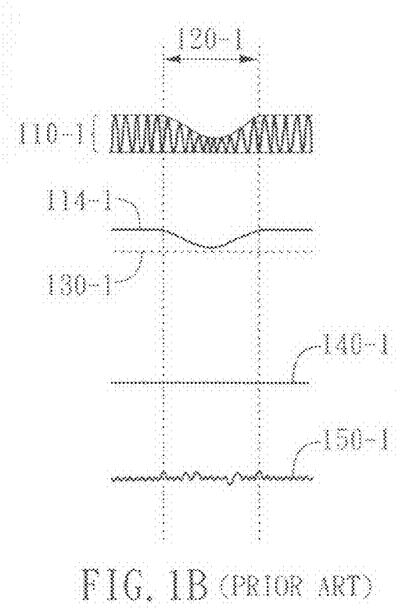
FIG. 1B is a schematic graph of signals of a shallow defect detected by applying a prior RF level detection.

FIG. 1B is a schematic graph of signals of a shallow defect detected by applying a well-known RF level detection. As shown in FIG. 1B, the RF signal 101-1 has a depressed portion 112-1 in the period 120-1. This also indicates that the data corresponding to the depressed portion 112-1 is damaged due to a defect, and accordingly the RF signal 110-1 in the period 120-1 cannot be read out at all. However, the depth of the depressed portion 112-1 may be affected just by a shallow defect such as a shallow scratch that is not as deep as the depressed portion 112 of FIG. 1A. The RFLVL signal 114-1 shows the envelop of the RF signal 110-1. The detection threshold 130-1, like the detection threshold 130 of FIG. 1A, can be a programmable DC reference voltage. Obviously, the RFLVL signal 114-1 always is higher than the detection threshold 130-1 because the concave portion 112-1 caused by the shallow detect is not deep enough. Therefore, the defect flag signal 140-1 does not respond to the shallow defect, and in this case noises can be introduced easily to thereby produce a defect and a decision mistake if the DC reference voltage corresponding to the detection threshold is increased for detecting a shallow concave defect. The FE/TE signal 150-1 in the period 120-1 can be changed due to a disk defect's interference, so as to produce a false signal variation. Further, since the shallow detect is not detected, some protection methods and devices are not triggered to thereby protect the system from voltage interference and instability. Namely, the servo system and the data path control system can be affected easily by such a defect.

U.S. Pat. No. 7,301,871 granted to Lai, et al. for a "Method and device for detecting the signal on a disc having a defect by utilizing an RF signal and its derivatives" uses a defect detection unit to receive a plurality of defect signals and to set a plurality of defect flag signals and uses a logic combination unit to perform a logic operation on the defect flag signals to thereby detect a special defect. However, such a method only uses the logic combination unit to perform a determination on the existing defect signals, which cannot provide further defect information.

Figure 2:
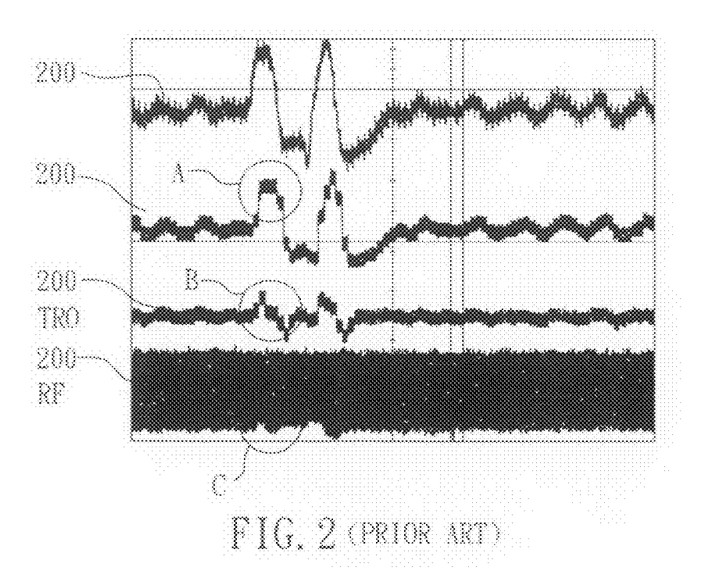
FIG. 2 is a schematic graph of a typical control signal detection of an optical disk drive.

FIG. 2 is a schematic graph of a typical control signal detection of an optical disk drive. As shown in FIG. 2, the signal 210 is a tracking error signal (TE) outputted by a preamplifier, the signal 220 is an internal tracking error signal of a defect detection unit, the signal 230 is a tracking control signal (TRO) for driving a tracking actuator (TA) of a servo control unit, and the signal 240 is an RF signal (RF) outputted by the preamplifier. When a laser beam passes through a shallow scratch or fingerprint on a track of a disc, as shown at the circle A of FIG. 2, the tracking error signal 220 produces a surge to indicate that the laser beam passes through a defect, so the tracking control signal 230 produces a corresponding surge (at the circle B) to drive the tracking actuator to compensate the tracking error. However, in inspecting the waveform of the RF signal 240 (at the circle C), it is found that the waveform of the RF signal 240 is different from the black-dot defect in which almost no RF signal is presented, but meanwhile the tracking control signal 230 compensates the tracking error signal 220. The laser beam is originally at the track, but the laser beam after the compensation by the tracking control signal 230 slides to a neighboring track.

Therefore, lots of problems are still existed in the conventional skill for detecting defect signals on an optical disc, and thus it is desirable to provide an improved device and method to mitigate and/or obviate the aforementioned problems.

SUMMARY OF THE INVENTION

The object of the present invention is to provide a method and device for detecting defect signals on an optical disc, which uses a finite state machine to solve the problem that a laser beam looses the focus point and/or slides from the original track to a neighboring track due to a false signal produced when the laser beam passes through a disc zone with a shallow scratch or fingerprint, so the reliability of the entire optical disk drive system is increased. In addition, a defect type, such as a white-dot defect which cannot be processed in the prior art, can be effectively detected. The invention is also suitable for a protection mechanism on tracking and focusing through the defects.

According to a feature of the invention, a method for detecting defect signals on an optical disc is provided, which uses a finite state machine (FSM) to control a servo system of an optical disk drive. In the following description, the FSM method is applied to FE signal (FE_XDFCT) and TE signal (TE_XDFCT) as trigger condition but any other signal or combination of signals can be used for this method. A separate state machine can be used for each signal or a state machine can be shared for a combination of signals. The method includes: (A) setting a detection counter to a predetermined value and making the FSM enter an ARM state when either one or a plurality of defect signals in a DETECT state are greater than their thresholds; (B) making the FSM enter a KICK state when the detection counter in the ARM state counts to a first predetermined value; (C) asserting a flag signal XDFCT when the FSM is in the KICK state, and making the FSM enter a WAIT state when the detection counter in the KICK state counts to a second predetermined value; and (D) making the FSM enter the DETECT state when the detection counter in the WAIT state counts to a third predetermined value: during the WAIT state, XDFCT signal can not be triggered again. As mentioned before, either a common state machine or independent state machines can be designed to generate different XDFCT signals, based on FE level detection (FE_XDFCT), TE level detection (TE_XDFCT) or a combination of these signals with other signals. Either 1 or more servo control signals for the servo system are clamped to a programmable constant voltage when the flag signal FE_XDFCT or TE_XDFCT is asserted.

According to a feature of the invention, a device for detecting defect signals on an optical disc is provided to control an optical disk drive. The device includes a servo system, a preamplifier and a defect detection unit. The servo system handles electromechanical parts of the optical disk drive. The preamplifier receives data signals from a lens to thereby produce corresponding servo control signals for the servo system and a plurality of defect signals. The defect detection unit is connected to the preamplifier and the servo system in order to control the servo system, and has a finite state machine (FSM) and a detection counter. When the FSM is in a KICK state, the flag signal XDFCT is asserted, and the corresponding servo control signals for the servo system of the optical disk drive are clamped to a programmable constant voltage.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
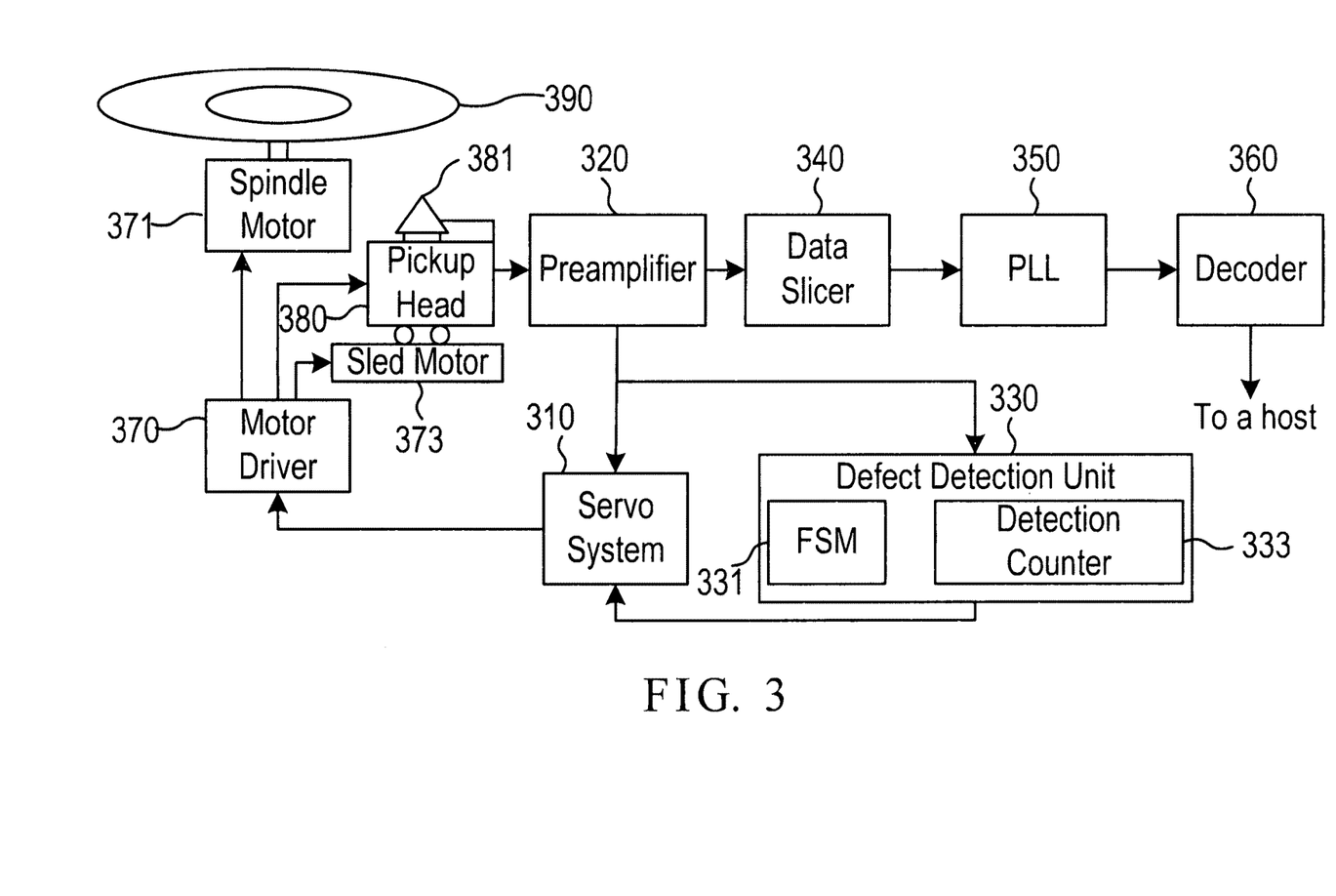
FIG. 3 is a block diagram of an optical disk drive with a device for detecting defect signals on an optical disc according to an embodiment of the invention.

FIG. 3 is a block diagram of an optical disk drive with a device for detecting defect signals on an optical disc according to an embodiment of the invention. In FIG. 3, the device includes a servo system 310, a preamplifier 320 and a defect detection unit 330.

The servo system 310 handles electromechanical parts of the optical disk drive.

The preamplifier 320 receives data signals from a lens 381 to thereby produce corresponding servo control signals for the servo system 310 and a plurality of defect signals.

The defect detection unit 330 is connected to the preamplifier 320 and the servo system 310 in order to control the servo system 310.

The optical disk drive further includes a data slicer 340, a phase lock loop (PLL) 350 and a decoder 360.

The servo system 310 handles the related electromechanical parts, such as the spin rate of a spindle motor 370, the movement of a sled motor 373 and the slightly tracking and focusing movement of the lens 381, through a motor driver 370. Namely, the servo system 310 can make the lens 381 not only aim at a right track of an optical disc 390 but also have a preferred focus for data reading and transferring. By means of roughly moving a pickup head 380 and slightly tracking movement of the lens 381 at horizontal direction, and slightly focusing movement of the lens 380 at the vertical direction, the servo system 310 can make the lens 381 be focused well on the right track of the optical disc 202.

The preamplifier 320 receives data signals from the lens 381 and produces various signals, such as RF signals for data processing, servo control signals for the servo system 310 or FE/TE servomotor and other signals for defect detection.

The data slicer 340 is connected to the preamplifier 320 in order to digitalize the RF signals outputted from the preamplifier 320. The PLL 350 is connected to the data slicer 340 in order to synchronize the digitalized RF signals to a system clock and count the length of the digitalized RF signals according to the system clock. The data slicer 340 and the PLL 350 can be integrated into a digital front end. The decoder 360 is connected to the PLL 350 in order to decode the length of the digitalized RF signals for an output to a host (not shown).

Figure 4:
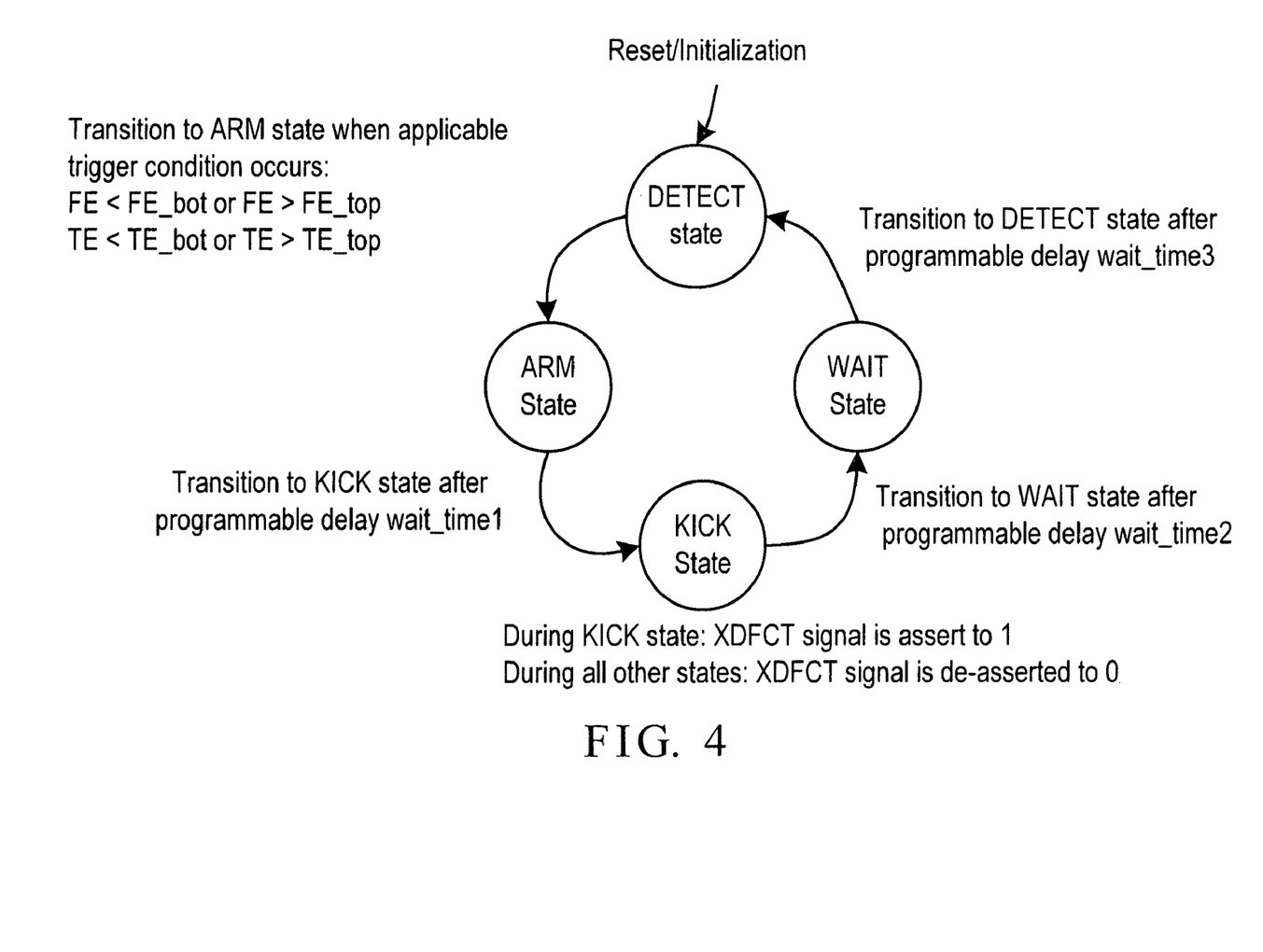
FIG. 4 is a schematic chart of a finite state machine (FSM) according to an embodiment of the invention.

The defect detection unit 330 includes a finite state machine (FSM) 331 and a detection counter 333. FIG. 4 is a schematic chart of the finite state machine (FSM) 331 according to an embodiment of the invention. The FSM has four states which are DETECT, ARM, KICK and WAIT states. When the FSM is in the KICK state, a flag signal XDFCT is asserted, and corresponding servo control signals for the servo system 310 of the optical disk drive are clamped to a programmable constant voltage. The flag signal XDFCT includes a first flag signal FE_XDFCT and a second flag signal TE_XDFCT. The constant voltage is preferably close to the output mute voltage, but can be any other value to compensate the initial drift of the servo system during the beginning of defect.

Figure 5:
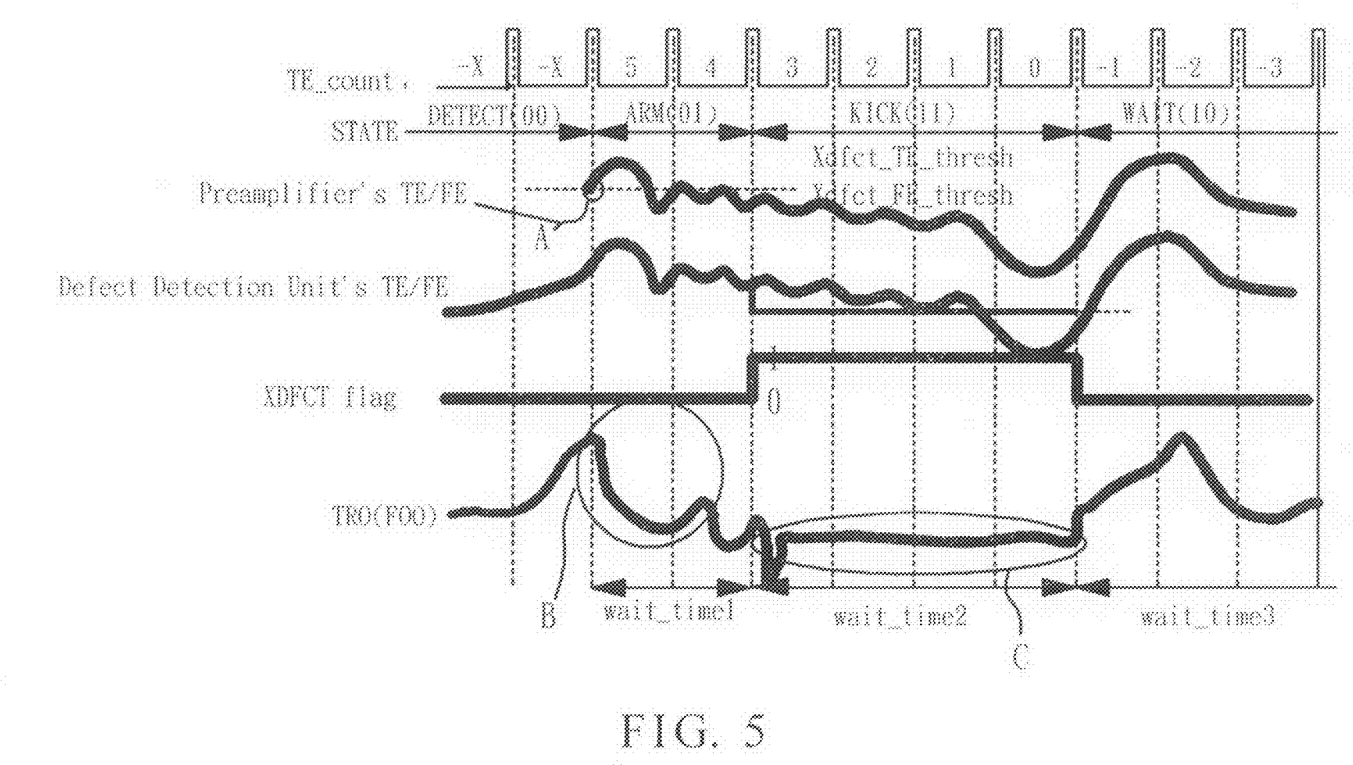
FIG. 5 is a schematic timing of the FSM of FIG. 4 according to an embodiment of the invention.

As shown in FIG. 4, after initialization or reset, the FSM 331 enters the DETECT state. FIG. 5 is a schematic timing of the FSM 331.

The FSM 331 in the DETECT state detects whether a plurality of defect signals are over their thresholds or not. The defect signals include a tracking error signal TE, and a focusing error signal FE.

When the selected defect signals are over the thresholds, the detection counter 333 is set to a predetermined value wait_time1, and the FSM 331 enters the ARM state.

When the FE signal is greater than a top focusing threshold FE_top or smaller than a bottom focusing threshold FE_bot, or when the TE signal is greater than a top tracking threshold TE_top or smaller than a bottom tracking threshold TE_bot. As shown at position 'A' of FIG. 5, when the TE signal is greater than the top tracking threshold TE_top the FSM 331 changes from the DETECT state to the ARM state.

When the FSM 331 makes the transition from DETECT to ARM state, the detection counter 333 is preset to the predetermined value wait_time1. Table 1 shows the basic code for entering the ARM state by the FSM 331, and those skilled in the art of hardware description language can easily obtain VHDL or Verilog codes and associated hardware based on Table 1 according to the invention, so the detail is not further described.

TABLE 1

If (FE > FE_top) or (FE < FE_bot) Then
   state = ARM_STATE
Else If (TE > TE_top) or (TE < TE_bot) Then
   state = ARM_STATE
Else state = DEFECT_STATE In this embodiment, both the FE signal and the TE signal are detected, but in other embodiments, it is applicable to detect only the FE signal or the TE signal.

When the FSM 331 is in the ARM state, the applicable XDFCT flag signal (FE_XDFCT and/or TE_XDFCT) are not asserted yet, and the corresponding servo control signals TRO, FOO for the servo system of the optical disk drive is a closed-loop control. Namely, the ARM state is regarded as a buffer. This is because the corresponding servo control signal TRO (or equivalently FOO) completes the over-compensation (shown at position 'B' of FIG. 5) when the TE signal is greater than the top tracking threshold TE_top, and in this case the system becomes unsteady and is easy to introduce noises once the corresponding servo control signal TRO is clamped to a constant voltage. The corresponding servo control signals for the servo system of the optical disk drive can be a tracking control signal TRO or a focusing control signal FOO.

When the FSM 331 is in the ARM state and the detection counter 333 has made the count-down from the first predetermined time wait_time 1 to zero, the FSM 331 enters the KICK state.

As shown at position 'C' of FIG. 5. When the FSM 331 is in the KICK state, the first flag signal FE_XDFCT or the second flag signal TE_XDFCT is asserted, and the corresponding servo control signals TRO, FOO for the servo system 310 of the optical disk drive can be clamped to a programmable constant voltage. The constant voltage is preferably close to the output mute voltage.

When the counter 333 has made the count-down from the second predetermined time wait_time2 to zero, the FSM 331 changes from the KICK state to the WAIT state and the detection counter is set at the value wait_time3. When the FSM 331 is in the WAIT state, the XDFCT flag of the FSM is deasserted again, including first flag signal FE_XDFCT and the second flag signal TE_XDFCT. Then, the corresponding servo control signals TRO, FOO are switched to the normal closed-loop control. In order to avoid the KICK state from being immediately changed into the DETECT state, the WAIT state is added to thereby increase the de-sensitivity on the system. Thus, the noise or overshoot interference to the system is prevented, and the system reliability is increased.

When the FSM 331 is in the WAIT state and the counter 331 has made the count-down from the third predetermined value wait_time3 to zero, the FSM 331 enters the DETECT state.

Figure 6:
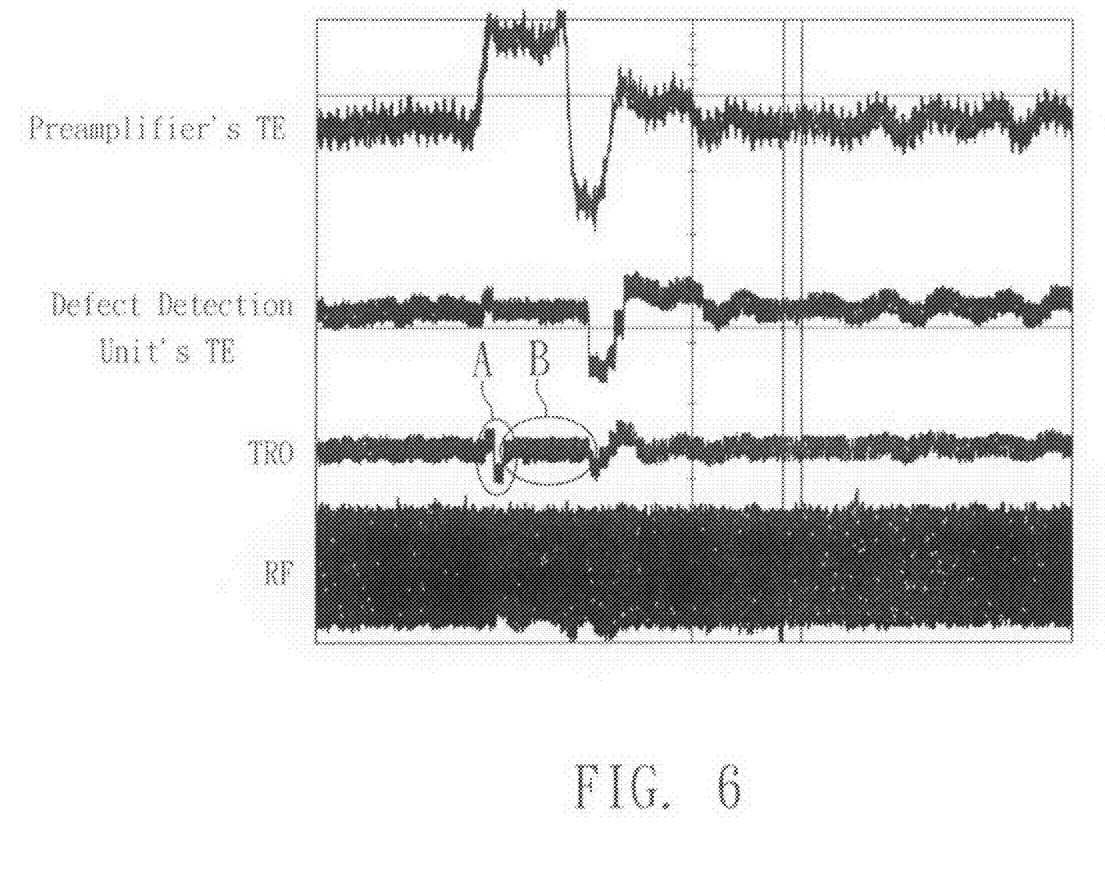
FIG. 6 is a schematic graph of a control signal detection of an optical disk drive according to an embodiment of the invention.

FIG. 6 is a schematic graph of a control signal detection of an optical disk drive according to an embodiment of the invention. As shown at position 'A' of FIG. 6, when the FSM 331 is in the ARM state, the corresponding servo control signal TRO is a closed-loop control. As shown at B of FIG. 6, when the FSM 331 is in the KICK state, the corresponding servo control signal TRO is clamped into a programmable constant voltage to thereby avoid the laser beam from sliding into a neighboring track due to a false signal.

Figure 7:
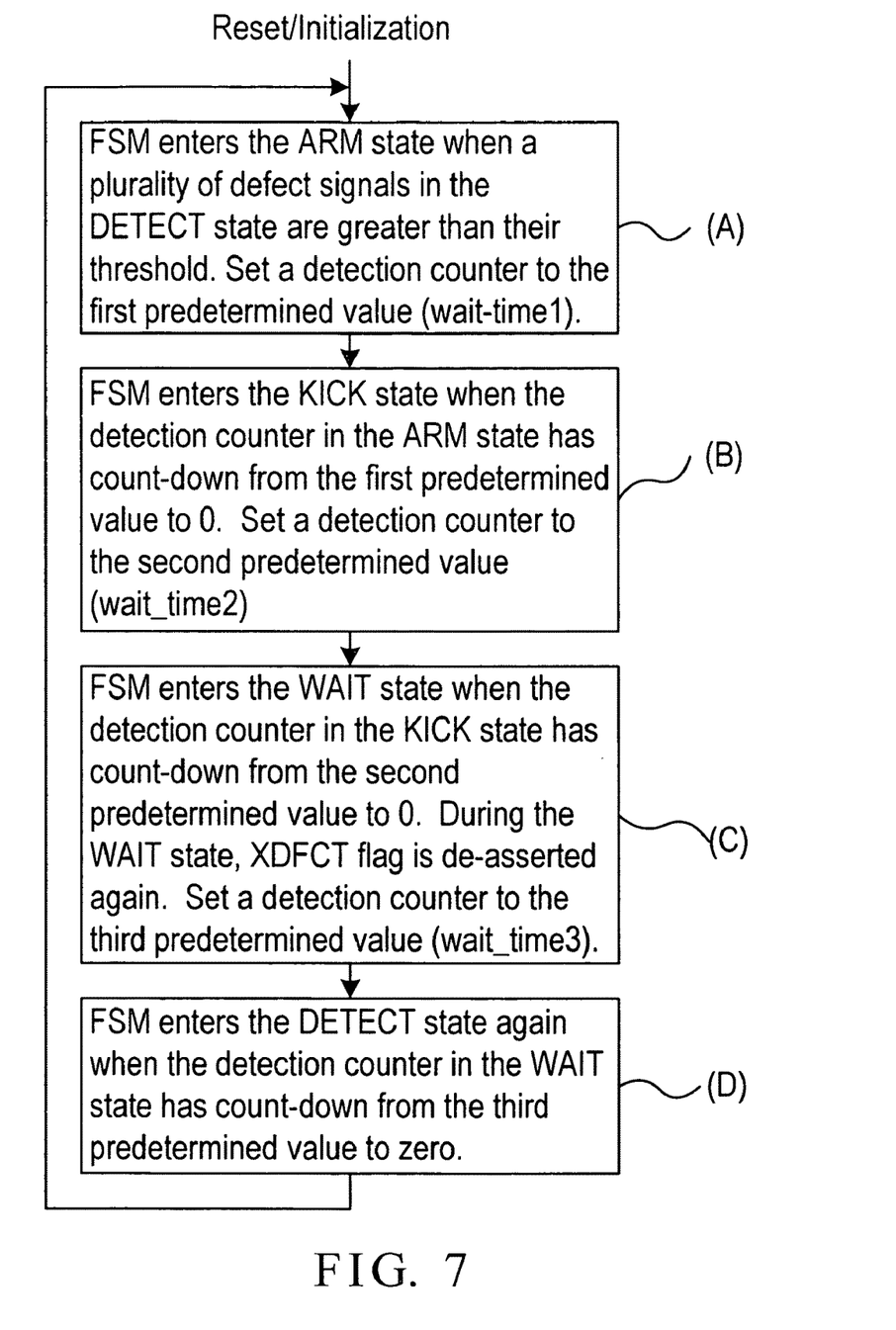
FIG. 7 is a flowchart of a method for detecting defect signals on an optical disc according to an embodiment of the invention.

FIG. 7 is a flowchart of a method for detecting defect signals on an optical disc according to an embodiment of the invention. The method uses the FSM 331 to control the servo system 310 of the optical disk drive. In step (A), the FSM 331 is in a DETECT state, and the detection counter TE_counter is set to a first predetermined value wait_time1 when a plurality of defect signals are over their thresholds. In this case, the FSM 331 enters an ARM state. The defect signals includes a tracking error signal TE and a focusing error signal FE.

When the FE signal is greater than a top focusing threshold FE_top or smaller than a bottom focusing threshold FE_bot, or when the TE signal is greater than a top tracking threshold TE_top or smaller than a bottom tracking threshold TE_bot, the FSM 331 enters the ARM state. As shown at position 'A' of FIG. 5, when the TE signal is greater than the top tracking threshold TE_top, the FSM 331 enters the ARM state.

In step (B), when the FSM 331 is in the ARM state and the counter 333 has countdown from the first predetermined value wait_time1 to zero, the FSM enters a KICK state and the counter will be set the second predetermined time wait_time2. When the FSM 331 is in the ARM state, the first flag signal FE_XDFCT and the second flag signal TE_XDFCT are not asserted, and the corresponding servo control signals TRO, FOO for the servo system of the optical disk drive are closed-loop control.

In step (C), when the FSM 331 is in the KICK state, the flag XDFCT, including signal FE_XDFCT or signal TE_XDFCT, is asserted. When at least one of the XDFCT signals is asserted, the corresponding servo control signals for the servo system 310 of the optical disk drive are clamped to a programmable constant voltage. When the counter has count-down from wait_time2 to zero, the FSM 331 enters a WAIT state and the detection counter will be set to the third predetermined time wait_time3.

In step (D), when the FSM is in the WAIT state and the counter 331 has count-down from the third predetermined value wait_time3 to zero, the FSM 331 enters the DETECT state. When the FSM 331 is in the WAIT state, the applicable XDFCT signals, including the first flag signal FE_XDFCT and the second flag signal TE_XDFCT are not asserted, and the corresponding servo control signals TRO, FOO are closed-loop control.

As cited, the invention solves the problem caused by a shallow scratch present on the track, i.e., for avoiding the KICK state from being immediately changed into the DETECT state, the WAIT state is added to thereby increase the de-sensitivity on the system. Thus, the noise or overshoot interference to the system is prevented, and the system reliability is increased. The invention also uses the FSM to solve the problem that a laser beam slides from the original track to a neighboring track due to a false signal produced when the laser beam passes through a track with a shallow scratch or fingerprint.

Although the present invention has been explained in relation to its preferred embodiment, it is to be understood that many other possible modifications and variations can be made without departing from the spirit and scope of the invention as hereinafter claimed.

What is claimed is:

1. A method for detecting defect signals on an optical disc, which uses a finite state machine (FSM) to control a servo system of an optical disk drive, the method comprising the steps:
   (A) setting a detection counter to a first predetermined value and making the FSM enter an ARM state when the defect signals in a DETECT state are greater than corresponding thresholds;
   (B) making the FSM enter a KICK state when the detection counter in the ARM state has count-down from the first predetermined value to zero, and setting the detection counter to a second predetermined value;
   (C) asserting a XDFCT flag signal when the FSM is in the KICK state, and making the FSM enter a WAIT state when the detection counter in the KICK state has count-down from the second predetermined value to zero, then setting the detection counter to a third predetermined value; and
   (D) making the FSM enter the DETECT state when the detection counter in the WAIT state has count-down from the third predetermined value to zero;
   wherein when the XDFCT flag signal is asserted, corresponding servo control signals for the servo system is clamped to a programmable constant voltage to prevent a laser beam of the optical disk drive sliding from a original track to a neighboring track due to a false signal produced.

2. The method as claimed in claim 1, wherein the FSM in the DETECT state detects whether the defect signals are over/under their thresholds, then the FSM enters the ARM state.

3. The method as claimed in claim 2, wherein the defect signals comprises a tracking error (TE) signal and a focusing error (FE) signal.

4. The method as claimed in claim 3, wherein the FSM enters the ARM state when the FE signal is greater than a top focusing threshold or smaller than a bottom focusing threshold, or when the TE signal is greater than a top tracking threshold or smaller than a bottom tracking threshold.

5. The method as claimed in claim 4, wherein the XDFCT flag signal is not asserted when the FSM is in the ARM state or the WAIT state, and then the corresponding servo control signal for the servo system of the optical disk drive is closed-loop control.

6. The method as claimed in claim 1, wherein the corresponding servo control signals for the servo system include a tracking control signal and a focusing control signal.

7. A device for detecting defect signals on an optical disc, which controls an optical disk drive, comprising:
   a servo system, for handling electromechanical parts of the optical disk drive;
   a preamplifier, for receiving data signals from a lens to produce corresponding servo control signal for the servo system and the defect signals; and
   a defect detection unit, connected to the preamplifier and the servo system, for controlling the servo system, the defect detection unit further has a finite state machine (FSM) and a detection counter for the FSM;
   wherein when the FSM is in a KICK state, the XDFCT flag signals are asserted and the corresponding servo control signal for the servo system is clamped to a programmable constant voltage to prevent a laser beam of the optical disk drive sliding from a original track to a neighboring track due to a false signal produced.

8. The device as claimed in claim 7, wherein the detection counter is set to a first predetermined value when the FSM is in a DETECT state and the defect signals are over/under thresholds, and then the FSM enters an ARM state after the detection counter is set to the first predetermined value.

9. The device as claimed in claim 8, wherein the FSM enters the KICK state when the detection counter in the ARM state has count-down from the first predetermined value to zero and the detection counter is then set a second predetermined value.

10. The device as claimed in claim 9, wherein the FSM enters a WAIT state when the detection counter in the KICK state has count-down from the second predetermined value to zero, and the detection counter is set to a third predetermined value.

11. The device as claimed in claim 10, wherein the FSM enters the DETECT state when the detection counter in the WAIT state has countdown from the third predetermined value to zero.

12. The device as claimed in claim 7, wherein the defect signals include a tracking error (TE) signal and a focusing error (FE) signal.

13. The device as claimed in claim 12, wherein a start detect flag is asserted when the FE signal is greater than a top focusing threshold or smaller than a bottom focusing threshold, or when the TE signal is greater than a top tracking threshold or smaller than a bottom tracking threshold.

14. The device as claimed in claim 13, wherein the FSM enters the ARM state after the detection counter is set to the first predetermined value.

15. The device as claimed in claim 11, wherein the XDFCT flag signal is not asserted when the FSM is in the ARM state or the WAIT state, and the corresponding servo control signal for the servo system of the optical disk drive is closed-loop control.

16. The device as claimed in claim 15, wherein the corresponding servo control signals for the servo system include a tracking control signal and a focusing control signal.

17. The device as claimed in claim 16, further comprising:
   a data slicer, connected to the preamplifier, for receiving an RF signal and outputting a digitalized RF signal;
   a phase lock loop (PLL), connected to the data slicer, for synchronizing the digitalized RF signal to a system clock and counting a length of the digitalized RF signal; and
   a decoder, connected to the PLL, for decoding the length of the digitalized RF signal for being outputted to a host.

* * * * *